Oct. 29, 1935.   R. KÖBERICH   2,019,350
REMOTE CONTROL AND INDICATING ARRANGEMENT
Filed Feb. 10, 1932
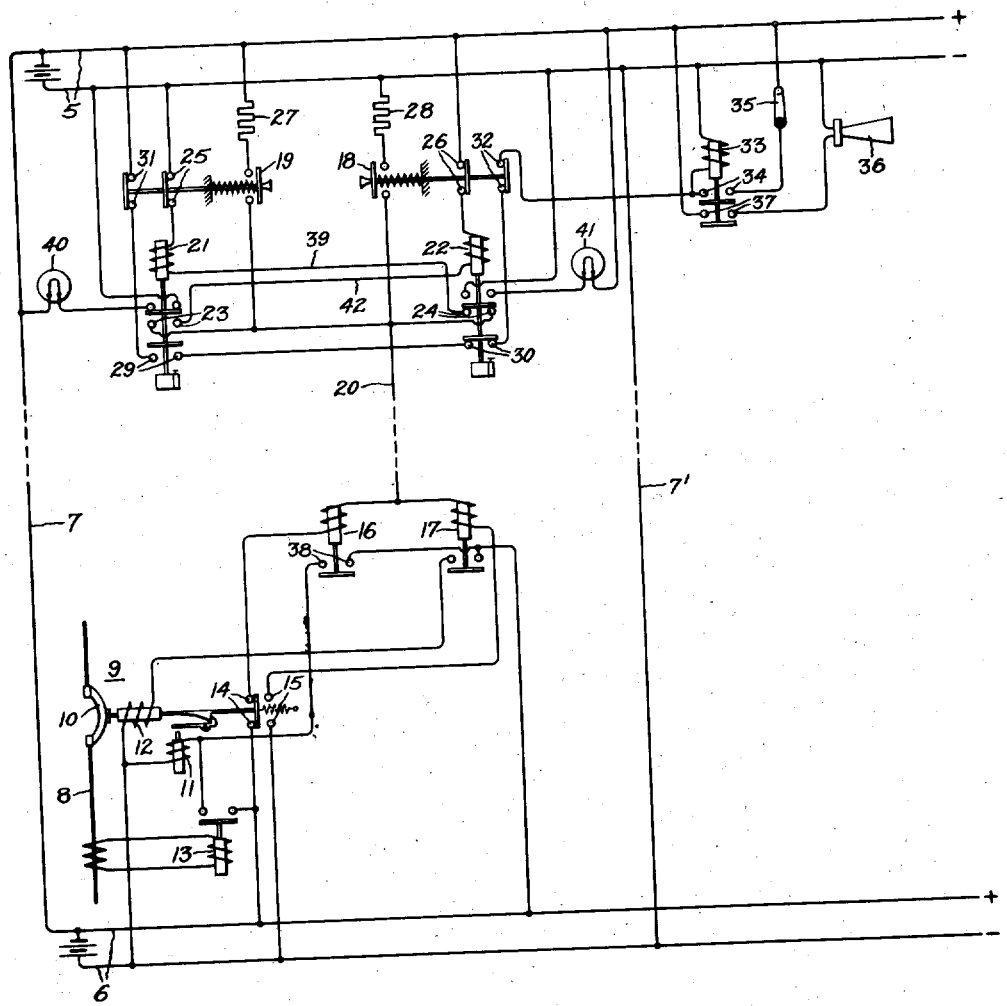
Inventor:
Rudolf Köberich,
by Charles V. Mulla
His Attorney.

Patented Oct. 29, 1935

2,019,350

UNITED STATES PATENT OFFICE 2,019,350

REMOTE CONTROL AND INDICATING ARRANGEMENT

Rudolf Köberich, Berlin-Tegel, Germany, assignor to General Electric Company, a corporation of New York Application February 10, 1932, Serial No. 592,152
In Germany February 18, 1931

6 Claims. (Cl. 177—311)

My invention relates to improvements in remote control and indicating arrangements for controlling a device having a member movable to a plurality of positions and for indicating the respective positions and also failures in the apparatus itself. One object of my invention is to provide a control and indicating arrangement which is, in general, an improvement on arrangements for this purpose heretofore known to the art and which gives a continuous indication of its own condition as well as that of the device to be controlled and a maximum of indications with a minimum of apparatus. Other objects of my invention will hereinafter appear.

Remote control and indicating arrangements wherein any desired number of movable parts are controlled from a central station over a separate line for each part and the changes of position of these parts are indicated at the central station over the same line are known. These remote control arrangements work on a so-called plus-minus basis, that is, the indicating relay pertaining to one position and the control relay which changes this positon when it operates are connected through contacts provided on the movable part of the device to be controlled, for example, a circuit breaker, to the poles of opposite signs of two batteries of which one is located in the central station and the other in the distant station and of which the poles of like signs are connected by special lines. In this case, the control switches on their actuation short-circuit the indicating relays which show the previously existing positioning of the parts so that the control relays receive enough more current to cause them to respond and change the position of the movable part, for example, the circuit breaker is closed or opened. The known arrangements of this kind have the disadvantage that it is not possible during the switching operation to ascertain the working of the parts to be operated. This is particularly disadvantageous in the case of remote control arrangements for electric power distributing plants where in the event of a short-circuit or overload, pumping, that is the continual opening and closing of a circuit breaker, may occur. A further disadvantage of the known arrangements is that in consequence of the control of the signaling apparatus by the normally open contacts of the indicating relays, a failure of the remote control and indicating arrangements cannot be ascertained in the case of purely signaling operations.

According to my invention, the disadvantages of these arrangements are eliminated by arranging or constructing the switching means in such a manner that the beginning and the end of the switching or moving operations is indicated at one or more observation stations. This is advantageously attained by increasing, by means of the operation of a control switch, the current in the control relay pertaining thereto to such an extent that the control relay responds but the indicating relay representing the previously existing condition is actuated only when the movable part of the device, such as a circuit breaker, to be controlled begins to change its position. In this case, the arrangement may preferably be such that when the power line is not interrupted and a contact of the movable part, for example an auxiliary switch on the circuit breaker is closed, the operation of the one indicating relay effects the deenergization or dropping out of a second indicating relay but that when the line is interrupted or when the contacts of the movable part are open, the two indicating relays alternately are attracted and released until the line fault is cleared or the switch contacts are closed.

My invention will be better understood from the following description when considered in connection with the accompanying drawing and its scope will be pointed out in the appended claims.

In the single figure of the accompanying drawing, there is represented diagrammatically an embodiment of my invention in its application to a remote control and indicating apparatus for an electric distribution system, there being shown for the purpose of simplifying the representation only the apparatus necessary to the control and indication of a single power switch instead of a plurality of switches, regulating devices, etc.

In the illustrated embodiment of my invention, I have shown at the supervisory control station of an electric system, a source of current such as a battery or bus system 5 and at a substation where devices are to be controlled a source of current such as a battery or bus system 6. One pole of one battery may be connected to the corresponding pole of the other battery, the other pole of each battery being earthed in each station or the poles of like signs may each be connected by separate conductors 7 and 7', as shown. The dotted line portions of these conductors are merely to give a conception of distance between the stations.

At the substation I have shown a portion of a power circuit 8 provided with a circuit breaker 9 which is to be taken as illustrative of a device having a movable member, such as the movable contact 10, the control of which is to be effected from the supervisory station and the indications of the positions of which are to be given at the supervisory station. As illustrated, the circuit breaker is of the latched closed type and includes tripping and closing windings 11 and 12 respectively. The circuit of the tripping winding may be controlled in response to abnormal conditions on the line 8 by any suitable fault responsive means which is herein illustrated for the sake of simplicity as an overcurrent relay 13. The circuit breaker 9 is provided with suitable auxiliary switching means, such as the contacts 14, 15. These are generally known to the art as "a" and "b" switches respectively, the former being closed when the circuit breaker is closed and open when the circuit breaker is open while the latter is open when the circuit breaker is closed and vice-versa. For controlling the circuits of the tripping and closing coils, there may be provided control relays 16 and 17, respectively, which are arranged to be selectively operated by suitable control switching means such as the control switches 18 and 19, respectively, at the supervisory station. These control switches are connected in the supervisory station to one pole of the battery 5 and to the opposite pole of the battery 6 through a common conductor 20, one of the control relays 16 and 17 pertaining to the circuit breaker 9, and the auxiliary contacts 14, 15 thereof. The current setting of the control relays 16, 17 is such that these relays can operate only when the respective control switch is closed but not when the indicating relays 21, 22 are connected in series with the corresponding control relays.

The indicating relays 21, 22 are connected to the conductor 20 and to the opposite poles of the battery 5 respectively. These relays are arranged in parallel with the control switches 19 and 18 respectively in such a manner that the indicating relay of one position is in parallel with the control switch that changes this position. The two indicating relays 21 and 22 are, moreover, connected in series over their circuit closing contacts 23, 24 in such a manner that the relay 21 upon operating disconnects the relay 22 at its circuit closing contacts 23. Similarly, the relay 22 upon operating disconnects the relay 21 at its contacts 24. Both of the indicating relays 21 and 22 may be provided with time delay devices for delay in the attracted movement. The control switches 18 and 19 are arranged to control contacts 25, 26 in the circuits of the indicating relays 21, 22, respectively, in such a way that the contacts 25 and 26 are closed when the control switches are in their normal positions but when one of the control switches is actuated the indicating relay associated with this switch is disconnected.

In circuit with the control switches 19 and 18 are suitable current limiting means, such as resistances 27, 28, which are of such values that when the control switch 19 or 18 is actuated, the indicating relay corresponding to the previously existing switching condition of the circuit breaker 9 does not immediately become deenergized. The indicating relays 21 and 22 through their normally closed contacts 29, 30 and the control switches 18 and 19 through their normally closed contacts 31, 32 control the circuit of a signal relay 33 which consequently operates only when neither of the control switches is closed and when both of the indicating relays are deenergized. After the signal relay 33 has responded, it seals itself in through its normally open contacts 34 and a disconnecting switch 35 for manual operation. When the signal relay 33 operates, it completes the circuit of a suitable signaling means such as a horn 36 through contacts 37. The relay 33 may, of course, be deenergized to stop the signal by opening the switch 35.

Assuming the parts positioned as shown in the drawing and that the control operator at the supervisory station desires to open the circuit breaker 9 at the controlled station, then the switch 18 is closed. This completes the circuit of the control relay 16 as follows: From minus of battery 5 over resistance 28, control switch 18, conductor 20, control relay 16 and auxiliary switch 14 to plus at battery 6. This energizes the control relay 16 which operates to close its contacts 38 in the circuit of the trip coil 11 whereby to effect the opening of the circuit breaker 9. Upon the closing of the control switch 18 the indicating relay 22 was disconnected from the plus bus of battery 5 at the contacts 26. The circuit of the indicating relay 21 was completed during the closed position of the circuit breaker as follows: From the minus bus of battery 5 to control switch contacts 25, indicating relay 21, conductor 39, contacts 24 of indicating relay 22, conductor 20, control relay 16, auxiliary switch contacts 14 to plus bus of battery 6. When the circuit breaker 9 opens there is a time interval when neither of the auxiliary switches 14 and 15 is closed. At this time the circuit of the indicating relay 21 is interrupted at contacts 14 so that by suitable indicating means, such as a red lamp 40 whose circuit is controlled by the indicating relay 21, the control operator can see that the power switching operation has started. For indicating the open position of the switch a white lamp 41 under the control of the indicating relay 22 may be provided.

If the control operator desires to ascertain how long a switching operation takes, he may either release the tripping control switch 18 so that it returns to its normal position where the contacts 26 are closed or these contacts alone may be closed while the switch 18 remains open. The two indicating relays 21 and 22 are now deenergized and close their contacts 23, 24 to complete a common circuit for their windings across the battery 5. Both relays operate and thus each interrupts the circuit of the other. This operation of the relays will, of course, be rendered visible by the flickering of the lights 40 and 41. When this flickering stops, the operation has ended because then the indicating relay 22 corresponding to the open position of the circuit breaker 9 is energized over a circuit from the plus bus of the battery 5 over control switch contacts 26, relay 22, conductor 42, indicating relay contacts 23, conductor 20, control relay 17, auxiliary switch 15, to minus of battery 6. It will be obvious that before the indicating relay 22 has operated by reason of its time delay, which is merely sufficient to enable the relay 33 to operate more quickly than either of the indicating relays, the circuit of the relay 33 has been completed over the closed contacts 31 and 32 of the control switches and the closed contacts 29 and 30 of the indicating relay.

It will be apparent that if the circuit breaker 9 is operated in response to abnormal circuit conditions, instead of by the control switches 18 and 19, the circuit open and circuit closed positions of the circuit breaker will be indicated by the lamps 41 and 40 through the indicating relays 22 and 21. If the circuit breaker mechanism is such that pumping may occur, then the indicating relays 21 and 22 will be alternately energized and deenergized, thus causing an alternate operation of the indicating relays and the lamps controlled thereby. It will be obvious that when the circuit breaker 9 changes its position, the indicating relay pertaining to the new position is caused to operate with a delay while the indicating relay that was previously energized and whose signal was previously operated becomes deenergized. If, for any reason, the conductor 20, for example, should become interrupted or the circuit breaker mechanism should stick in a position where neither of the auxiliary switches is closed, then the circuit of the indicating relays from one station to the other would be interrupted and the relays would both be deenergized simultaneously to complete their common series circuit across the battery 5 whereby both relays would be simultaneously energized and deenergized to control the lamps 40, 41. By having the relays identically timed the signal under these conditions would consist of both lamps 40 and 41 being alternately lighted and extinguished.

In place of the resistances 27 and 28 it will be clear to those skilled in the art that, in accordance with my invention, there may be employed other suitable switching means or there may be arranged in series with the control switches additional windings on the indicating relays so arranged on the relay core as to strengthen the field produced by the winding shown. Such an arrangement has the advantage that the matching of the resistances to the indicating and control relays can be eliminated. The second winding would be of such dimensions that the corresponding relay, when the control relay is operated, remains in the attracted position while the corresponding control relay operates. The indication of the duration of a circuit breaker switching operation by the mutual operation of the indicating relays 21 and 22 which involves a suitable adjustment of the two relay windings with respect to each other can be avoided by providing the two relays, which during the switching operation are in series between the poles of the battery, with an additional winding which is as large as the initial winding and which is traversed by the same current and so arranged that the magnetic fields of the two windings cancel. When the switching operation ends one of the two windings of the indicating relays is connected in series with the corresponding switching relay. This supplementary asymmetrical current produces a supplementary field which causes the response of that indicating relay which pertains to the new switching condition.

The arrangement, according to my invention, can be provided with a device for indicating the breakage of a wire in a short-circuit or the like and if it is desired that the alterations of switching positions should be shown by steady or intermittent light indications, the indicating relays are provided with further contacts for the control of signal lamps, visual signals and the like. For this purpose there may be provided switching devices which are controlled by the signal relay or by hand and which will supply the indicating lamps either with steady light or intermittent light on the occurrence of changes of position.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. In a remote control and indicating arrangement for a device having a member movable to a plurality of positions, a plurality of electromagnetic means for effecting an indication of each of at least two positions of said member, each of said electromagnetic means including a movable member, a circuit for each of said electromagnetic means, means controlled by each of said electromagnetic means for controlling the circuit of another of said electromagnetic means, means for controlling the circuits of said electromagnetic means in accordance with the position of the device member, a common circuit for said electromagnetic means and means for controlling said common circuit in accordance with the positions of the moveable members of said electromagnetic means.

2. In a remote control and indicating arrangement for an electric switch, a plurality of electromagnetic means for effecting indications of the circuit open and closed positions of said switch, a circuit for each of said electromagnetic means, each of said electromagnetic means having a circuit controlling member in the circuit of another of said electromagnetic means, auxiliary switching means operative in dependence on the circuit controlling positions of said electric switch for controlling the circuits of said electromagnetic means in accordance with the opening and closing of the electric switch, a common circuit for said electromagnetic means and means for completing said common circuit upon deenergization of the electromagnetic means.

3. In a remote control and indicating arrangement for a device having a member movable to a plurality of positions, a plurality of electromagnetic means for effecting an indication of each of at least two positions of said member, each of said electromagnetic means including a movable member, a circuit for each of said electromagnetic means, means controlled by each of said electromagnetic means for controlling the circuit of another of said electromagnetic means, means movable with said device member for controlling the circuits of said electromagnetic means in accordance with the position of the device member, a common circuit for said electromagnetic means, means for controlling said common circuit in accordance with the positions of the movable members of the electromagnetic means and means for controlling the operation of said device member and the circuit common to said electromagnetic means.

4. In a remote control and indicating arrangement for a device having a member movable to a plurality of positions, control relays selectively operable to effect the movement of said member to two of its positions, indicating relays for effecting an indication of said two positions of the member, a circuit for each of said indicating relays including a winding of one of said control relays, means operative by each of said indicating relays for controlling the circuit of another of said indicating relays, means for controlling the circuit of each of said indicating relays and the associated control relay, switching means operable from their normal positions selectively to effect the operation of said control relays and to open the circuits of said indicating relays, a common circuit for said indicating relays and contacts controlled by said indicating relays for completing said common circuit when the indicating relays are deenergized and said switching means are in their normal positions.

5. In a remote control and indicating arrangement for an electric switch at a given location, control relays at said location selectively operable to effect the opening and closing of said switch, indicating relays at another location for effecting indications of the open and closed positions of said electric switch, a circuit for each of said indicating relays including the winding of one of said control relays, means controlled by each of said indicating relays for controlling the circuit of another of said indicating relays, auxiliary switching means operated in accordance with the circuit controlling positions of said electric switch for controlling the circuit of each of said indicating relays and the associated control relay in accordance with the opening and closing of the switch, control switching means at said other location operable from their normal positions selectively to effect the operation of said control relays and to open the circuits of said indicating relays, a common circuit for said indicating relays and contacts controlled by said indicating relays for completing said common circuit when the indicating relays are deenergized and the control switching means are in their normal positions.

6. In a remote control and indicating arrangement for a device having a member movable to a plurality of positions, a plurality of means for effecting an indication of at least two positions of said member, a circuit for each of said indicating means, means controlled by one of said indicating means for controlling the circuit of another of said indicating means, means for controlling the circuits of said indicating means in accordance with the position of said member, a common circuit for said indicating means and means controlled by said indicating means for controlling said common circuit.

RUDOLF KÖBERICH.